(12) United States Patent
Galpin et al.

(10) Patent No.: US 12,343,618 B2
(45) Date of Patent: Jul. 1, 2025

(54) DISPLAY CONTROL IN CLOUD GAMING APPLICATIONS

(71) Applicant: InterDigital Madison Patent Holdings, SAS, Paris (FR)

(72) Inventors: Franck Galpin, Thorigne-Fouillard (FR); Fabrice Le Leannec, Betton (FR); Thierry Dumas, Rennes (FR); Karam Naser, Mouaze (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 44 days.

(21) Appl. No.: 18/035,418

(22) PCT Filed: Nov. 2, 2021

(86) PCT No.: PCT/EP2021/080411
§ 371 (c)(1),
(2) Date: May 4, 2023

(87) PCT Pub. No.: WO2022/096467
PCT Pub. Date: May 12, 2022

(65) Prior Publication Data
US 2023/0415036 A1 Dec. 28, 2023

(30) Foreign Application Priority Data

Nov. 6, 2020 (EP) ..................................... 20306339
Nov. 6, 2020 (EP) ..................................... 20306340

(51) Int. Cl.
*H04N 7/12* (2006.01)
*A63F 13/355* (2014.01)
(Continued)

(52) U.S. Cl.
CPC ......... *A63F 13/355* (2014.09); *H04N 19/172* (2014.11); *H04N 19/30* (2014.11);
(Continued)

(58) Field of Classification Search
CPC ............ A63F 13/355; A63F 2300/5593; A63F 13/47; H04N 19/172; H04N 19/30; H04N 19/46; H04N 19/50
See application file for complete search history.

(56) References Cited

U.S. PATENT DOCUMENTS 10,990,996 B1 * 4/2021 Podgorny .......... G06Q 30/0218
11,406,906 B2 * 8/2022 Miura ..................... A63F 13/63
(Continued)

FOREIGN PATENT DOCUMENTS

WO   WO 2013084078 A1   6/2013

OTHER PUBLICATIONS

Bross et al, "Versatile video coding (draft 9)", Joint Video Experts Team (JVET) of ITU-T SG 16 WP 3 and ISO/IEC JTC 1/SC 29/WG 11, Document: JVET-R2001-vA, 18th Meeting, by teleconference, Apr. 15, 2020, 524 pages.

(Continued)

*Primary Examiner* — Gims S Philippe
(74) *Attorney, Agent, or Firm* — Condo Roccia Koptiw LLP

(57) ABSTRACT

A method for controlling a display of a frame representing a state of a game in a network-based gaining application comprising: sending (301A) an information representative of a user action to a server; receiving (305B) at least one frame representing a predicted state of the game predicted from the user action; obtaining an information allowing determining if said at least one frame corresponds to the user action; and, if the at least one frame corresponds to said user action, determining when displaying one of the at least one frame in function of a time at which this user action was performed and of said information.

20 Claims, 8 Drawing Sheets

(51) Int. Cl.
  *H04N 19/172* (2014.01)
  *H04N 19/30* (2014.01)
  *H04N 19/46* (2014.01)
  *H04N 19/50* (2014.01)
(52) U.S. Cl.
  CPC ............ *H04N 19/46* (2014.11); *H04N 19/50* (2014.11); *A63F 2300/5593* (2013.01)

(56) References Cited

U.S. PATENT DOCUMENTS

| | | | | |
|---|---|---|---|---|
| 2018/0246937 | A1* | 8/2018 | Alphin, III | G06F 16/904 |
| 2018/0254959 | A1* | 9/2018 | Mantyjarvi | G06F 3/04883 |
| 2019/0050440 | A1* | 2/2019 | Novak | G06F 16/235 |
| 2019/0289017 | A1* | 9/2019 | Agarwal | H04L 9/0643 |
| 2020/0314479 | A1* | 10/2020 | Umansky | H04N 21/8133 |
| 2023/0033340 | A1* | 2/2023 | Cary | A63F 13/44 |

OTHER PUBLICATIONS

Anonymous, "LCEVC", Wikipedia: The Free Encyclopedia, Nov. 4, 2020, URL: https://en.wikipedia.org/w/index.php?title=LCEVC&oldid=986983896, 3 pages.

Anonymous, "Versatile Video Coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.266, Aug. 2020, 516 pages.

Finn et al., "Unsupervised Learning for Physical Interaction through Video Prediction", Proceedings of the 30th International Conference on Neural Information Processing Systems (NIPS), Oct. 17, 2016, 12 pages.

Anonymous, "Advanced Video Coding for Generic Audiovisual Services", International Telecommunication Union, ITU-T Telecommunication Standardization Sector of ITU, Series H: Audiovisual and Multimedia Systems, Infrastructure of audiovisual services—Coding of moving video, Recommendation ITU-T H.264, Jan. 2012, 680 pages.

Anonymous, "Information technology—General video coding—Part 1: Essential video coding", International Organization for Standardization (ISO), Coding of audio, picture, multimedia and hypermedia information, ISO/IEC JTC 1/SC 29, Document: ISO/IEC FDIS 23094-1, Oct. 2020, 351 pages.

Rivaz et al., "AV1 Bitstream & Decoding Process Specification", The Alliance for Open Media, AOMedia, Version 1.0.0, Jun. 25, 2018, 677 pages.

Anonymous, "WD of ISO/IEC 23008-1 AMD2 Cross Layer Interface", International Organization for Standardization (ISO), Coding of Moving Pictures and Audio, ISO/IEC JTC1/SC29/WG11, Document: MPEG/N13612, Incheon, Korea, Apr. 2013, 12 pages.

Grange et al., "VP9 Bitstream & Decoding Process Specification", Google, Inc., Version 0.6, Mar. 31, 2016, 171 pages.

Lee et al., "Outatime Using Speculation to Enable Low-Latency Continuous Interaction for Mobile Cloud Gaming", MobiSys '15: Proceedings of the 13th Annual International Conference on Mobile Systems, Applications and Services, May 2015, 15 pages.

\* cited by examiner

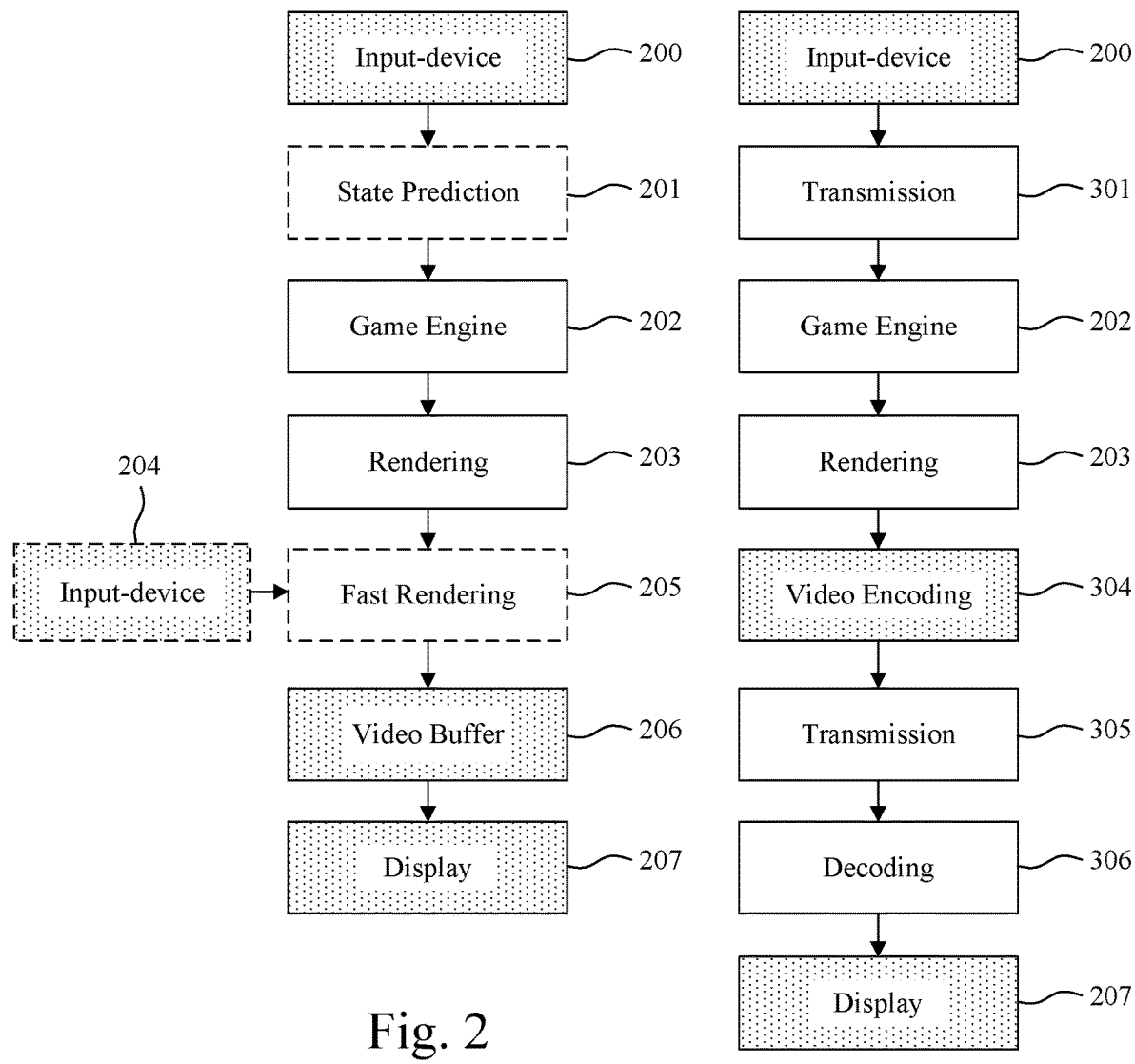

DISPLAY CONTROL IN CLOUD GAMING APPLICATIONS

CROSS REFERENCE TO RELATED APPLICATIONS

This application is a U.S. National Stage Application under 35 U.S.C. § 371 of International Patent Application No. PCT/EP2021/080411, filed Nov. 2, 2021, which is incorporated herein by reference in its entirety.

This application claims priority to European Application Nos. 20306339.1, filed Nov. 6, 2020, and 20306340.9, filed Nov. 6, 2020, each of which is incorporated herein by reference in its entirety.

1. TECHNICAL FIELD

At least one of the present embodiments generally relates to a method and an apparatus for controlling an encoding of images in cloud gaming applications.

2. BACKGROUND

Cloud gaming allows for partly offloading a game rendering process to some remote game servers situated in a cloud.

FIG. 1 represents schematically a cloud gaming infrastructure. Basically, a game engine 10 and a 3D graphics rendering 11, which require costly and power consuming devices, are implemented by a server 1 in the cloud. Generated frames are then classically encoded in a video stream with a regular video encoder 12 and sent to a user game system 2 via a network 3. The video stream is then decoded on the user game system 2 side with a regular/standard video decoder 20 for rendering on a display device. An additional lightweight module 21 is in charge of managing the gamer interaction commands (i.e. of registering user actions).

One key factor for user comfort in gaming applications is a latency called motion-to-photon, i.e. the latency between a user action (motion) and the display of the results of this action on the display device (photon).

FIG. 2 describes schematically a typical motion-to-photon path in a traditional gaming application.

The steps described in relation to FIG. 2 are all implemented by a user game system, such as a PC or a console. We suppose here that the user game system comprises an input device (such as a joypad) and a display device.

In a step 200, a user action is registered by the input device and sent to a main processing module.

In a step 202, the registered action is used by a game engine to compute a next game state (or next game states). A game state includes a user state (position, etc.), as well as all other entities states which can be either computed by the game engine or external state in case of multi-players games.

In a step 203, from the game state, a frame rendering is computed. The resulting frame is first placed in a video buffer in a step 206 and the content of the video buffer is then displayed on a display device in a step 207.

Each of the above steps introduces a processing latency. In FIG. 2, boxes with a dotted background represents steps introducing a latency due to hardware computations. In general, this latency is fixed, small and cannot be changed easily. Boxes with a white background, represent steps introducing a latency due to software computations. In general, this latency is longer and can be adapted dynamically.

In total, the motion-to-photon latency is usually lower than "100" milliseconds (ms). Typically, user discomfort starts when latency is higher than "200" ms. Note that for games based on virtual reality using a headset visualization, a lower latency is usually needed for a good user comfort.

FIG. 3 describes schematically a typical motion-to-photon path in a cloud gaming application.

The steps described in relation to FIG. 3 are no more implemented by a single device but, as represented in FIG. 1, require the collaboration between a server 1 and a user game system 2 (i.e. a client system).

Step 200 is executed by the user game system 2.

In a step 301, information representative of the user action is transmitted to the server 1 via the network 3.

The game engine 202 and rendering 203 steps are implemented by the server 1.

The rendering is followed by a video encoding by the video encoder 12 in a step 304.

The video stream generated by the video encoder 12 is then transmitted to the user game system 2 via the network 3 in a step 305 and decoded by the video decoder in a step 306.

Comparing to the process of FIG. 2, additional latencies are introduced:

Transmission latency. The transmission latency depends on a connection quality of the network. This latency can range from few ms to few "100" ms.

Encoder latency: in such framework, the encoder is typically used in low-delay configuration, i.e. as soon as a frame arrives, it is encoded and sent in the video stream. A real-time video encoder usually encodes a frame in few ms, a fortiori, when this video encoder is implemented in hardware.

Decoder latency: a typical video decoder can decode a frame in few ms.

As can be seen, the additional latencies (in particular the transmission latency) can potentially increase the global latency such that said global latency becomes unacceptable for the user. Moreover, the latency variance also increases due to the network conditions changes.

It is desirable to propose solutions allowing to overcome the above issues. In particular, it is desirable to propose a method and an apparatus contributing to a reduction of the latency in gaming applications.

3. BRIEF SUMMARY

In a first aspect, one or more of the present embodiments provide a method for controlling a display of a frame representing a state of a game in a network-based gaming application comprising: sending an information representative of a user action to a server; receiving at least one frame representing a predicted state of the game predicted from the user action; obtaining an information allowing determining if said at least one frame corresponds to the user action; and; if the at least one frame corresponds to said user action, determining when displaying one of the at least one frame in function of a time at which this user action was performed and of said information.

In an embodiment, said information is representative of a delay between the time at which this user action was performed and a time at which a frame corresponding to said user action is displayed.

In an embodiment, the method is executed by a user system and wherein, the information allows determining when displaying one of the at least one frame by allowing synchronizing a clock of the user system on a clock of the server.

In an embodiment, the at least one frame is received in the form of an encoded video stream comprising metadata, said metadata comprising said information.

In an embodiment, the information representative of the user action transmitted to the server comprise an identifier of the user action and the metadata comprise said identifier.

In an embodiment, the metadata comprise an information representative of a delay fixing a time at which a predicted state corresponding to the user action is predicted.

In an embodiment, a plurality of frames each representing a predicted state of the game predicted from the user action is received and the method further comprises determining which frame of the plurality displaying in function of a comparison between an information representative of an actual state of the game and an information representative of a predicted state represented by a frame of the plurality.

In an embodiment, the metadata comprises for each frame of the plurality an information representing the state of the game represented by said frame.

In an embodiment, the information representative of an actual state of the game and the information representative of a predicted state represented by a frame of the plurality are information representative of a sequence of user actions.

In a second aspect, one or more of the present embodiments provide a method for controlling a display of a frame representing a state of a game in a network-based gaming application comprising: receiving from a user system an information representative of a user action comprising an identifier of said user action; predicting at least one state of the game from the user action; for at least one predicted state, rendering a frame representing said predicted state; encoding in a portion of a video stream at least one rendered frame with metadata comprising the identifier of said user action; and, transmitting the portion of video stream to the user system.

In an embodiment, the metadata comprise an information representative of a delay fixing a time at which a predicted action corresponding to the user action is predicted.

In an embodiment, a plurality of frames each representing a predicted state of the game predicted from the user action is rendered and encoded with metadata comprising information representative of each predicted state.

In an embodiment, the information representative of a predicted state of the game is representative of a sequence of user actions.

In an embodiment, the encoding of the plurality of frames uses a multi-layer encoding taking into account an information representative of at least one real state or predicted state of the game.

In a third aspect, one or more of the present embodiments provide a method for controlling an encoding of frames representing states of a game in a network-based gaming application comprising: receiving from a user system an information representative of a user action comprising an identifier of said user action; predicting a plurality of states of the game, called predicted states, from the user action; for each predicted state, rendering a frame representing said predicted state; and, encoding the rendered frames, each frame being encoded in one layer of a plurality of layers of a video stream using a multi-layer encoding taking into account an information representative of at least one real state or predicted state of the game.

In an embodiment, an information representative of a predicted state is a probability of said predicted state.

In an embodiment, the frame corresponding to the highest probability is encoded in a layer, called base layer, encoded without any prediction from any other layer and which may serve as a reference for a prediction of some other layer.

In an embodiment, a bitrate is allocated to each layer for encoding said layer in function of the probability of said layer.

In an embodiment, an information representative of a real state is an information representative of a frame of a plurality of frames displayed by a user system to which said plurality of frames was transmitted.

In an embodiment, a first layer providing a frame for temporal prediction of a current frame of a second layer is determined in function of the frame of a plurality of frames displayed by a user system.

In an embodiment, the information representative of a frame of a plurality of frames displayed by a user system is an information representative of a user action received from the user system.

In an embodiment, an information representative a predicted state comprises differences between the predicted states.

In a fourth aspect, one or more of the present embodiments provide a device for controlling a display of a frame representing a state of a game in a network-based gaming application comprising: means for sending an information representative of a user action to a server; means for receiving at least one frame representing a predicted state of the game predicted from the user action; means obtaining an information allowing determining if said at least one frame corresponds to the user action; and; means for determining when displaying one of the at least one frame in function of a time at which this user action was performed and of said information if the at least one frame corresponds to said user action.

In an embodiment, said information is representative of a delay between the time at which this user action was performed and a time at which a frame corresponding to said user action is displayed.

In an embodiment, the information allows determining when displaying one of the at least one frame by allowing synchronizing a clock of the device on a clock of the server.

In an embodiment, the at least one frame is received in the form of an encoded video stream comprising metadata, said metadata comprising said information.

In an embodiment, the information representative of the user action transmitted to the server comprise an identifier of the user action and the metadata comprise said identifier.

In an embodiment, the metadata comprise an information representative of a delay fixing a time at which a predicted action corresponding to the user action is predicted.

In an embodiment, a plurality of frames each representing a predicted state of the game predicted from the user action is received and wherein the device further comprises means for determining which frame of the plurality displaying in function of a comparison between an information representative of an actual state of the game and an information representative of a predicted state represented by frames of the plurality.

In an embodiment, the metadate comprises for each frame of the plurality an information representing the state of the game represented by said frame.

In an embodiment, the information representative of an actual state of the game and the information representative of a predicted state represented by a frame of the plurality are information representative of a sequence of user actions.

In a fifth aspect, one or more of the present embodiments provide a device for controlling a display of a frame representing a state of a game in a network-based gaming application comprising: means for receiving from a user system an information representative of a user action comprising an identifier of said user action; means for predicting at least one state of the game from the user action; means for rendering, for at least one predicted state, a frame representing said predicted state; means for encoding in a portion of a video stream at least one rendered frame with metadata comprising the identifier of said user action; and, means for transmitting the portion of video stream to the user system.

In an embodiment, the metadata comprise an information representative of a delay fixing a time at which a predicted action corresponding to the user action is predicted.

In an embodiment, a plurality of frames each representing a predicted state of the game predicted from the user action is rendered and encoded with metadata comprising information representative of each predicted state.

In an embodiment, the information representative of a predicted state of the game is representative of a sequence of user actions.

In an embodiment, the encoding of the plurality of frames uses a multi-layer encoding taking into account an information representative of at least one real state or predicted state of the game.

In a sixth aspect, one or more of the present embodiments provide a device for controlling an encoding of frames representing states of a game in a network-based gaming application comprising: means for receiving from a user system an information representative of a user action comprising an identifier of said user action; means for predicting a plurality of states of the game, called predicted states, from the user action; means for rendering, for each predicted state, a frame representing said predicted state; and, means for encoding the rendered frames, each frame being encoding in one layer of a plurality of layers of a video stream using a multi-layer encoding taking into account an information representative of at least one real state or predicted state of the game.

In an embodiment, an information representative of a predicted state is a probability of said predicted state.

In an embodiment, the frame corresponding to the highest probability is encoded in a layer, called base layer, encoded without any prediction from any other layer and which may serve as a reference for a prediction of some other layer.

In an embodiment, a bitrate is allocated to each layer for encoding said layer in function of the probability of said layer.

In an embodiment, an information representative of a real state is an information representative of a frame of a plurality of frames displayed by a user system to which said plurality of frames was transmitted.

In an embodiment, a first layer providing a frame for temporal prediction of a current frame of a second layer is determined in function of the frame of a plurality of frames displayed by a user system In an embodiment, the information representative of a frame of a plurality of frames displayed by a user system is an information representative of a user action received from the user system.

In an embodiment, an information representative a predicted state comprises differences between the predicted states.

In a seventh aspect, one or more of the present embodiments provide an apparatus comprising a device according to the fourth, the fifth or the sixth aspect.

In a eighth aspect, one or more of the present embodiments provide a signal generated by the method of the second aspect or by the device of the fifth aspect or the sixth aspect.

In a ninth aspect, one or more of the present embodiments provide a computer program comprising program code instructions for implementing the method according to the first, the second or the third aspect.

In a tenth aspect, one or more of the present embodiments provide a non-transitory information storage medium storing program code instructions for implementing the method according to the first, the second or the third aspect.

4. BRIEF SUMMARY OF THE DRAWINGS

Figure 4A:
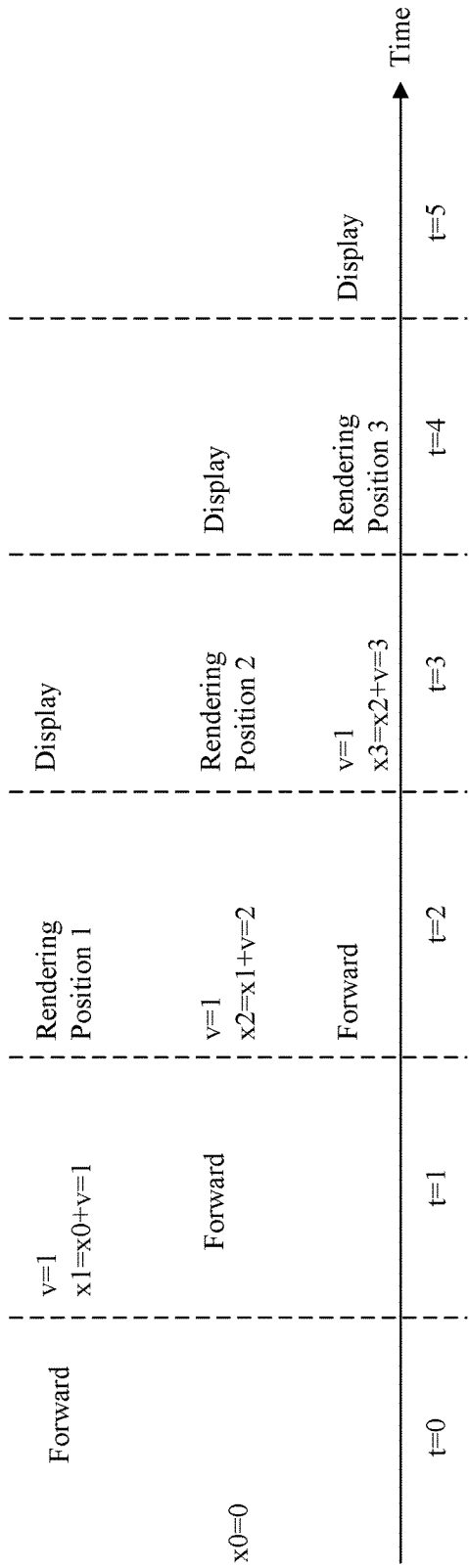
Figure 4B:
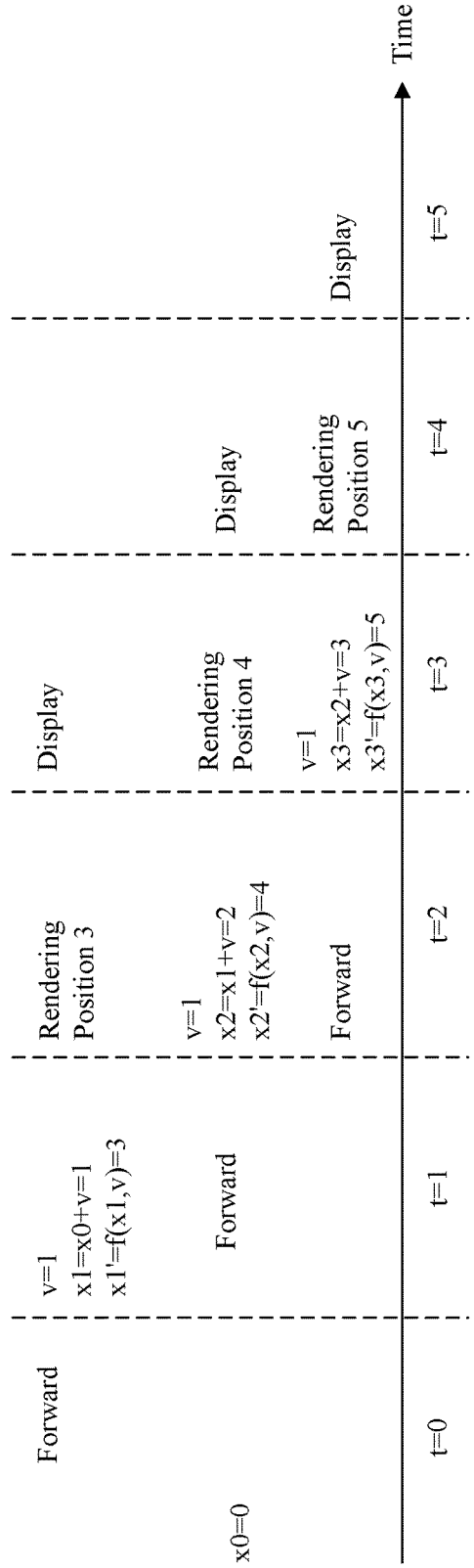
Figure 5:
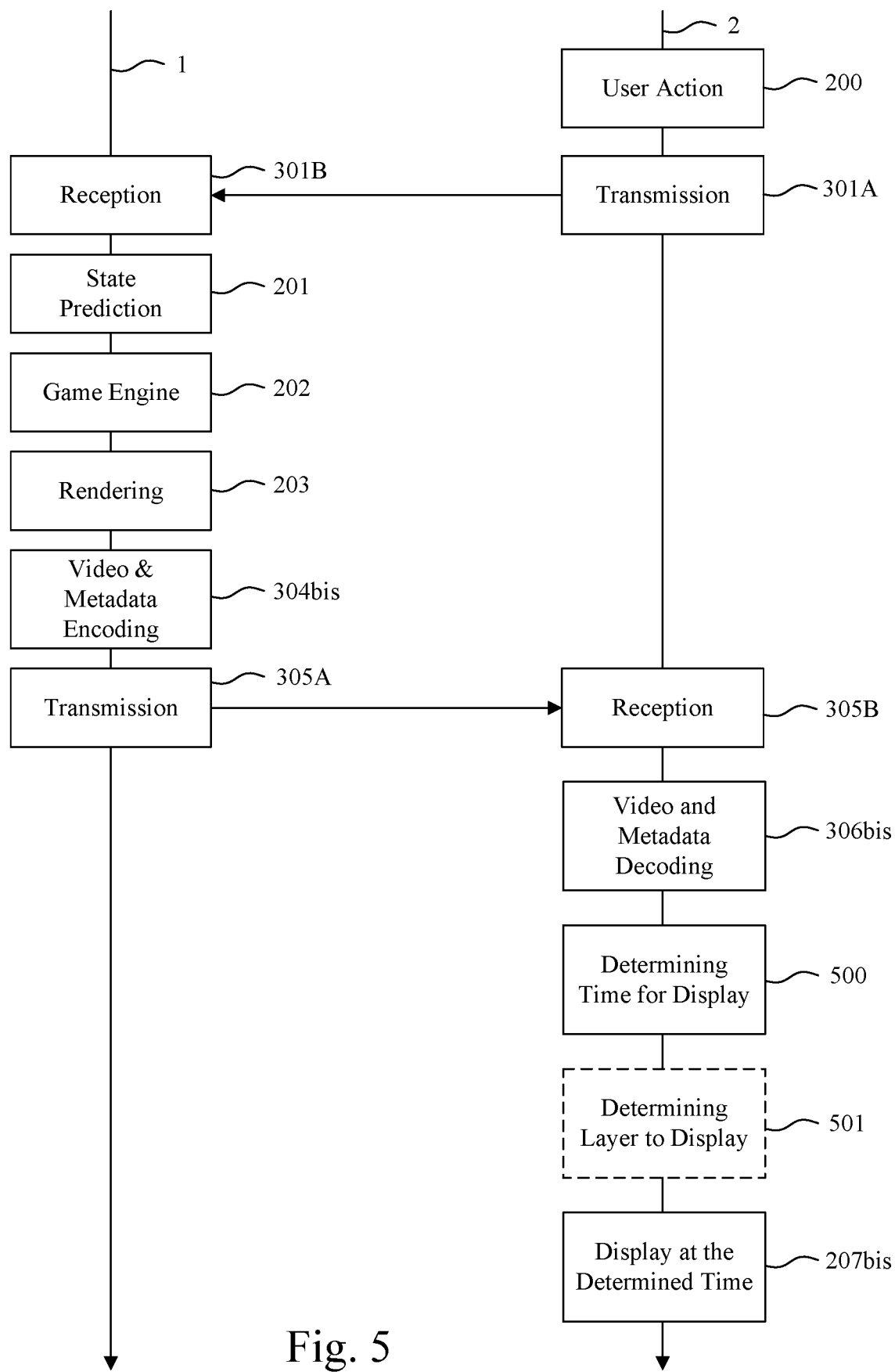
Figure 6:
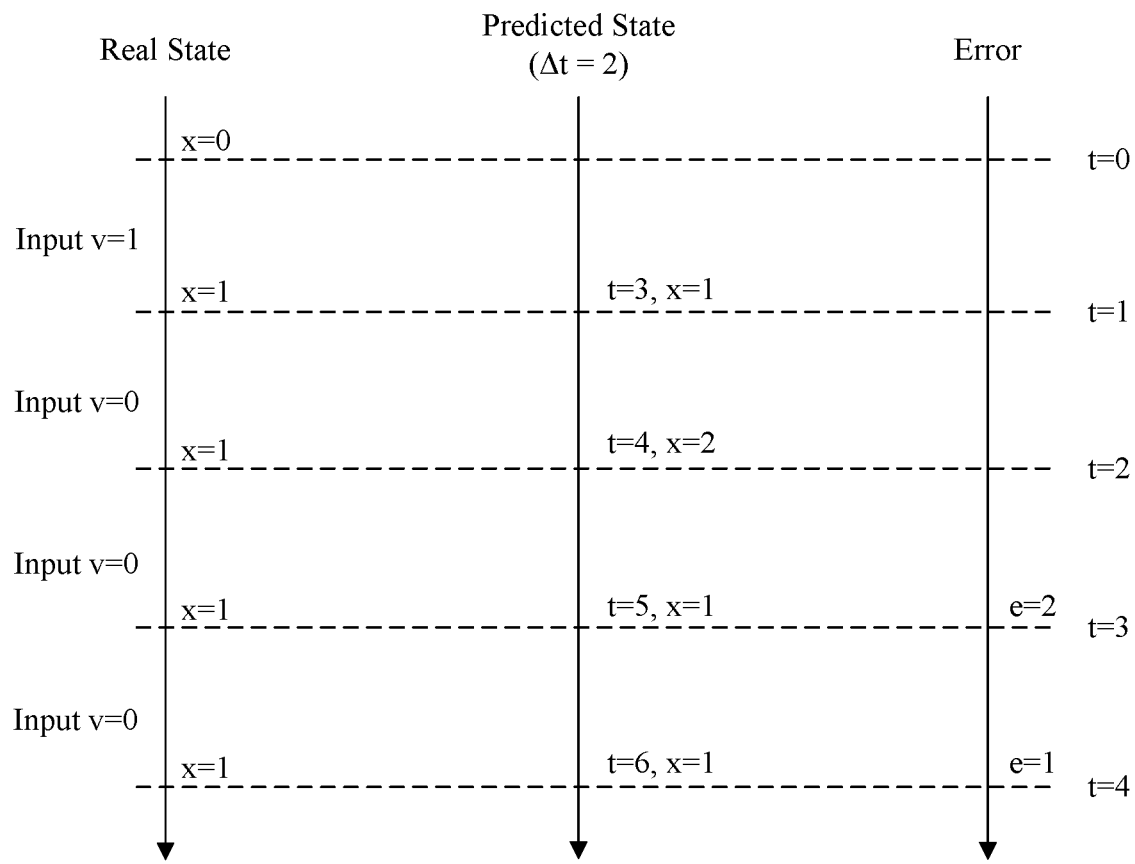
Figure 7:
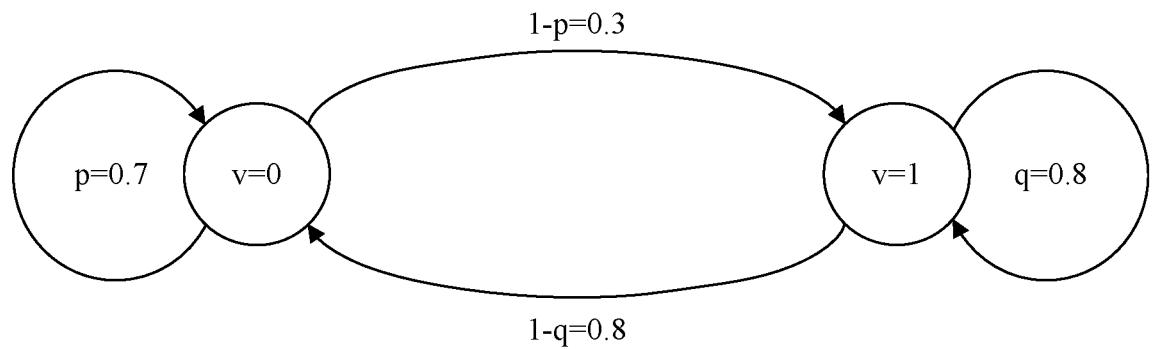
Figure 8:
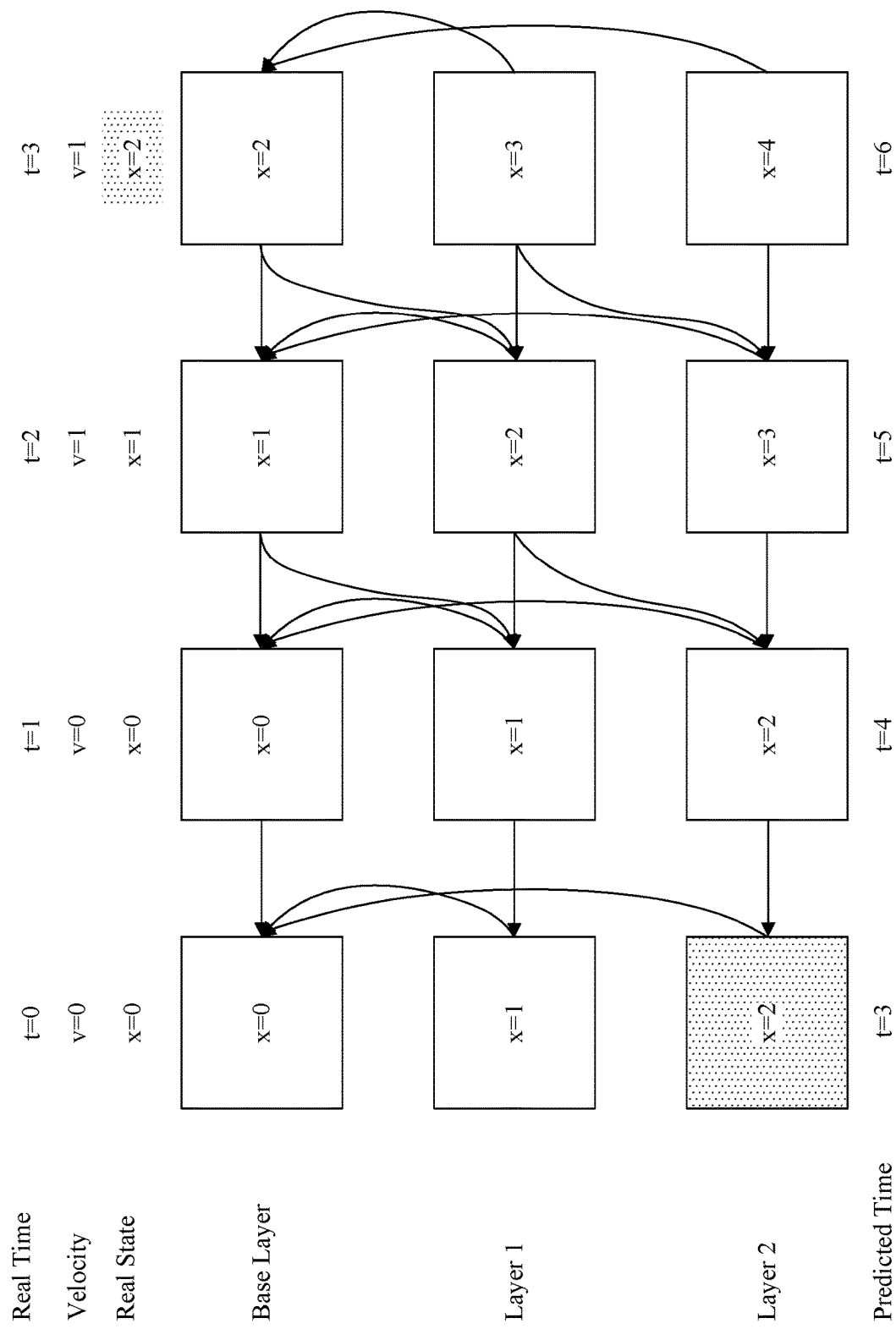
Figure 9:
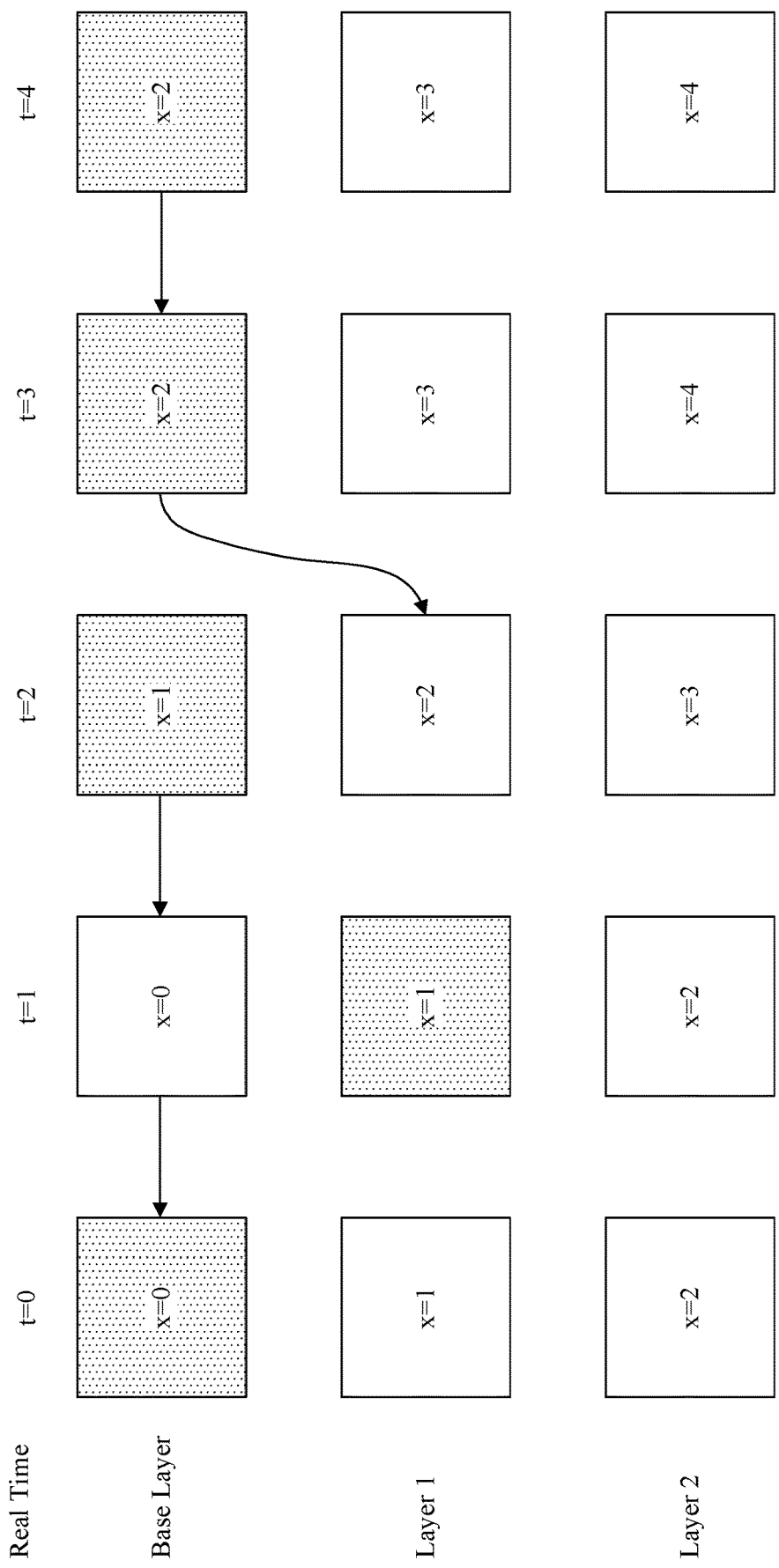

FIG. 2 describes schematically a typical motion-to-photon path in a traditional gaming application;

FIG. 3 describes schematically a typical motion-to-photon path in a cloud gaming application;

FIGS. 4A and 4B represents examples of execution of the method of FIG. 2 respectively without and with a state prediction;

FIG. 5 illustrates schematically an example of a embodiment of a method for reducing latency in a cloud gaming application;

FIG. 6 illustrates schematically a state prediction process wherein prediction errors occur;

FIG. 7 represents a two states Markov model modeling states of a game;

FIG. 8 illustrates schematically an example of multi-layer video encoding; and,

FIG. 9 illustrates an example of application of an encoding step.

DETAILED DESCRIPTION

In the following, the various embodiments are presented in a network (cloud) gaming context. However, these embodiments apply also in other contexts, and apply in particular to any network-based application wherein a user performs an actions on a client device, and the result of this action is calculated by a remote server and received by the client device from the remote server. The objective here is to improve the fluidity of the application.

Various methods addressed the problem of latency reduction in the past. These methods can be divided in two categories:

methods based on states prediction; and,
methods based on an approximate rendering.

Methods based on states prediction, such as method based on extended Kalman filters (EKF) or on particle filters, consist in predicting future states of a game in order to compute a rendering ahead of a current real state of the game. In the process of FIG. 2, an optional step of state prediction 201 is introduced.

FIGS. 4A and 4B represents examples of execution of the method of FIG. 2 respectively without and with the state prediction step 201.

In FIG. 4A, at time t=0, the user, for example, pushes a forward button on the input device. This action is interpreted as a velocity v of "1". A new position is computed from the velocity v=1 and the previous position x0=0. The new position is now x1=1. From the new position, a rendering is performed and sent to the display device. At time t=3, the user can see the results of its action with a latency of "3" (from t=0 to t=3). Optimally, without any latency, the user would have seen the frame with position "0" at t=0, the frame with position "1" at t=1 etc.

In FIG. 4B, at time t=0, the user pushes the forward button on the input device. This action is interpreted as a velocity v of "1". The new "real" position is computed from the velocity v=1 and the previous position x0=0. The new "real" position is now x1=1. A predicted position is computed (step 201), using a function $f( )$, from the real position and other current state information (for example here, the velocity). The predicted position aims at predicting the position at time "t"=3 instead of using the current state only. Here the predicted position is x1'=3. From the predicted position, a rendering is performed and sent to the display. At time t=3, the user could have seen the result of its action with a latency of "3" (from t=0 to t=3), but the state prediction "erases" this latency and the user sees the result of its action at time t=3 (assuming here that the state predictor correctly predicted the state evolution). Optimally, if the state predictor is "perfect", the user will see the frame with position "0" at t=0, the frame with position "1" at t=1 etc. In practice, the function $f( )$ is based on a combination of current state values and user motion model. A typical example consists in using a Kalman filtering to predict such motion. In practice, more sophisticated predictor (Model Predictive Control) or ad-hoc models are used. Recently, deep-learning based method allowed a significant improvement on video frame prediction. As an example, in document "*C. Finn, I. Goodfellow and S. Levine, unsupervised learning for physical interaction through video prediction, in Advances in Neural Information Processing Systems, 2012*", called FINN in the following, a neural network (NN) is built to predict future frames of a video sequence using past frames and actions/states as input. FINN introduces a class of video prediction models that directly use appearance information from previous frames to construct pixel predictions. Such models compute a next frame by first predicting the motions of image segments and then merge these predictions via masking.

An example of method based on an approximate rendering is represented in FIG. 2 by an insertion of steps 204 et 205. Such methods are known as time warping or Asynchronous Time warping (ATW).

Step 204 consists in obtaining new user action, newer than the user action obtained in step 200.

In step 205, the frame generated at step 203 (based on the user action obtained at step 200) and the new action are used to create an approximate version of the frame that would have been rendered by steps 202 and 203 using the new user action. A fast rendering process is used to generate said approximate version. A typical fast rendering process consists in computing a warped image from the user rotational motion only (i.e. the warping transformation can be computed as an homography transform). More advanced methods also use other information (depth map, dynamic object positions etc.) to improve the approximate rendering.

Figure 1A:
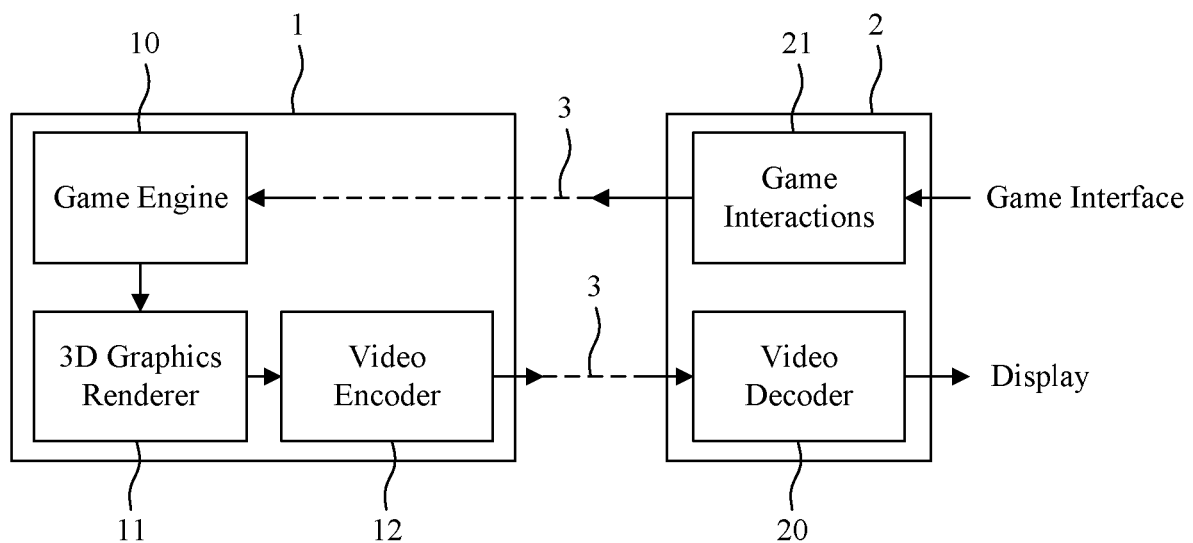
FIG. 1A represents schematically a cloud gaming infrastructure.
Figure 1B:
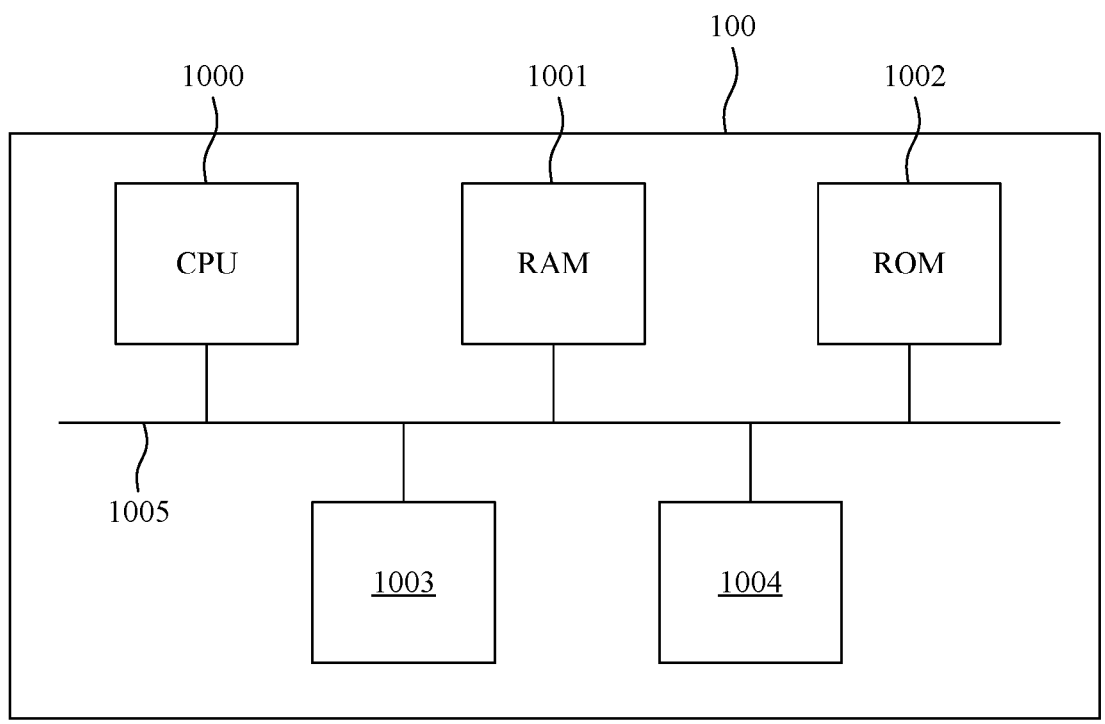
FIG. 1B illustrates schematically an example of hardware architecture of a processing module able to implement various aspects and embodiments.

FIG. 1B illustrates schematically an example of hardware architecture of a processing module 100 able to implement steps of a game application implemented by the server 1 or steps of a game application implemented by the user game system 2. The processing module is therefore comprised in the server 1 or in the user game system 2. The processing module 100 comprises, connected by a communication bus 1005: a processor or CPU (central processing unit) 1000 encompassing one or more microprocessors, general purpose computers, special purpose computers, and processors based on a multi-core architecture, as non-limiting examples; a random access memory (RAM) 1001; a read only memory (ROM) 1002; a storage unit 1003, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 1004 for exchanging data with other modules, devices or equipment. The communication interface 1004 can include, but is not limited to, a transceiver configured to transmit and to receive data over a communication channel. The communication interface 1004 can include, but is not limited to, a modem or network card.

If the processing module 100 implements the steps of a gaming application executed by the server 1, the communication interface 1004 enables for instance the processing module 100 to receive information representative of user actions from the user game system 2 and to transmit a video stream embedding encoded frames an metadata to said user game system 2. If the processing module 100 implements the steps of a game application executed by the user game system 2, the communication interface 1004 enables for instance the processing module 100 to send information representative of user actions to the server 1 and to receive a video stream comprising encoded frames and metadata.

The processor 100 is capable of executing instructions loaded into the RAM 1001 from the ROM 1002, from an external memory (not shown), from a storage medium, or from a communication network. When the processing module 100 is powered up, the processor 1000 is capable of reading instructions from the RAM 1001 and executing them. These instructions form a computer program causing, for example, the implementation by the processor 1000 of the steps of a gaming application executed by the server 1, as described in the following in the left part of FIG. 5 or the steps of a gaming application executed by the user game system 2, as described in the following in the right part of FIG. 5.

All or some of the algorithms and steps of said gaming application may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 1C:
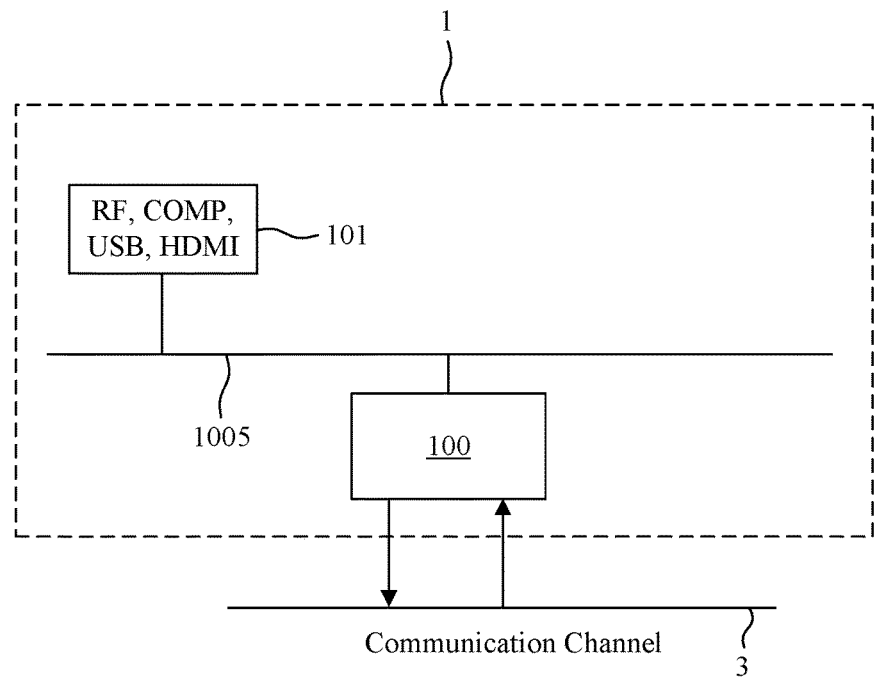
FIG. 1C illustrates a block diagram of an example of a server in which various aspects and embodiments are implemented.
Figure 1D:
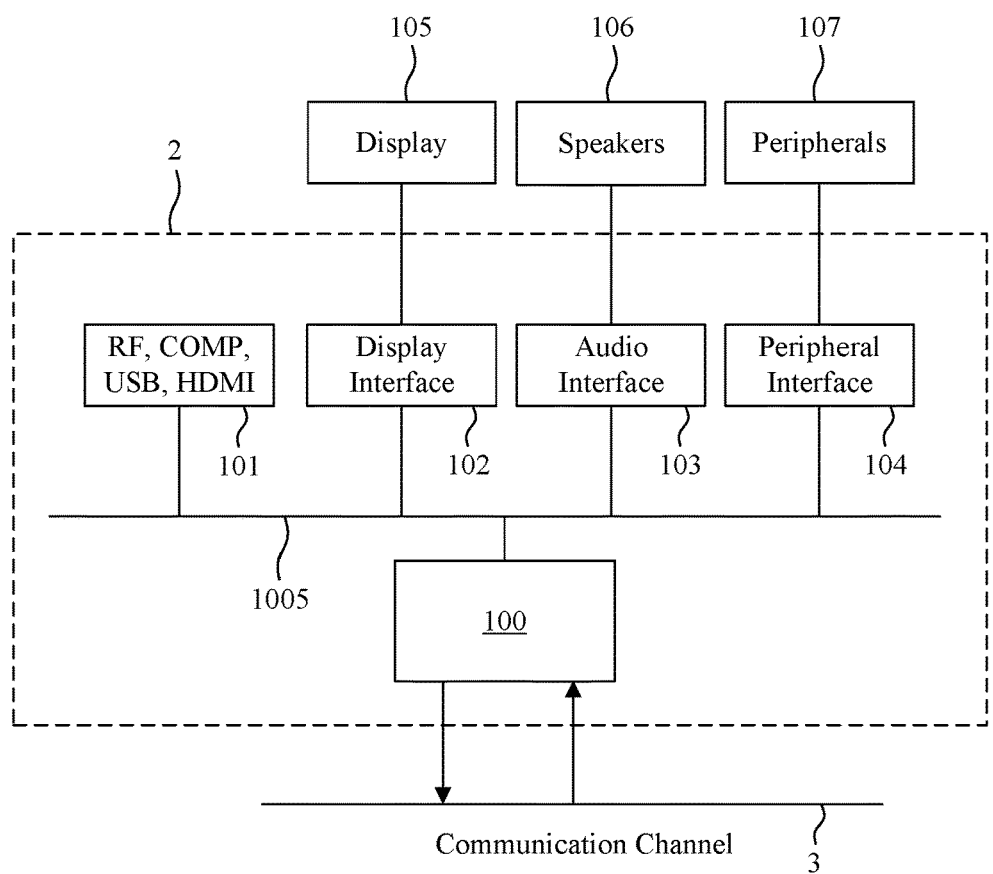
FIG. 1D illustrates a block diagram of an example of a user game system in which various aspects and embodiments are implemented.

FIG. 1D illustrates a block diagram of an example of the user game system 2 in which various aspects and embodiments are implemented. The user game system 2 can be embodied as a device including the various components described below and is configured to perform one or more of the aspects and embodiments described in this document. Examples of such device include, but are not limited to, various electronic devices such as personal computers, laptop computers, smartphones, tablet computers, gaming consoles and head mounted displays. Elements of user game system 2, singly or in combination, can be embodied in a single integrated circuit (IC), multiple ICs, and/or discrete components. For example, in at least one embodiment, the user game system 2 comprises one processing module 100 that implements steps of the gaming application concerning the user gaming system. In various embodiments, the user gaming system 2 is communicatively coupled to one or more other systems, or other electronic devices, via, for example, a communications bus or through dedicated input and/or output ports. In various embodiments, the user game system 2 is configured to implement one or more of the aspects described in this document.

The input to the processing module 100 can be provided through various input modules as indicated in block 101. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 1D, include composite video.

In various embodiments, the input modules of block 101 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting the user game system 2 to other electronic devices across USB and/or HDMI connections. It is to be understood that various aspects of input processing, for example, Reed-Solomon error correction, can be implemented, for example, within a separate input processing IC or within the processing module 100 as necessary. Similarly, aspects of USB or HDMI interface processing can be implemented within separate interface ICs or within the processing module 100 as necessary. The demodulated, error corrected, and demultiplexed stream is provided to the processing module 100.

Various elements of the user game system 2 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the user game system 2, the processing module 100 is interconnected to other elements of said user game system 2 by the bus 1005.

The communication interface 1004 of the processing module 100 allows the user game system 2 to communicate on the communication channel 3. As already mentioned above, the communication channel 3 can be implemented, for example, within a wired and/or a wireless medium.

Data is streamed, or otherwise provided, to the user game system 2, in various embodiments, using a wireless network such as a Wi-Fi network, for example IEEE 802.11 (IEEE refers to the Institute of Electrical and Electronics Engineers). The Wi-Fi signal of these embodiments is received over the communications channel 3 and the communications interface 1004 which are adapted for Wi-Fi communications. The communications channel 3 of these embodiments is typically connected to an access point or router that provides access to external networks including the Internet for allowing streaming applications and other over-the-top communications. Other embodiments provide streamed data to the user game system 2 using the RF connection of the input block 101. As indicated above, various embodiments provide data in a non-streaming manner. Additionally, various embodiments use wireless networks other than Wi-Fi, for example a cellular network or a Bluetooth network.

The user game system 2 can provide an output signal to various output devices, including a display system 105, speakers 106, and other peripheral devices 107. The display system 105 of various embodiments includes one or more of, for example, a touchscreen display, an organic light-emitting diode (OLED) display, a curved display, and/or a foldable display. The display 105 can be for a television, a tablet, a laptop, a cell phone (mobile phone), a head mounted display or other devices. The display system 105 can also be integrated with other components (for example, as in a smart phone), or separate (for example, an external monitor for a laptop). The other peripheral devices 107 include, in various examples of embodiments, one or more input devices such as a stand-alone digital video disc (or digital versatile disc) (DVR, for both terms), a disk player, and a user actions acquisition device such as a joypad and one or more output devices such as a stereo system, or a lighting system.

In various embodiments, control signals are communicated between the user game system 2 and the display system 105, speakers 106, or other peripheral devices 107 using signaling such as AV.Link, Consumer Electronics Control (CEC), or other communications protocols that enable device-to-device control with or without user intervention. The output/input devices can be communicatively coupled to user game system 2 via dedicated connections through respective interfaces 102, 103, and 104. Alternatively, the output/input devices can be connected to user game system 2 using the communications channel 3 via the communications interface 1004 or a dedicated communication channel corresponding to the communication channel the communication interface 1004. The display system 105 and speakers 106 can be integrated in a single unit with the other components of the user game system 2 in an electronic device such as, for example, a television. In various embodiments, the display interface 102 includes a display driver, such as, for example, a timing controller (T Con) chip.

The display system 105 and speaker 106 can alternatively be separate from one or more of the other components. In various embodiments in which the display system 105 and speakers 106 are external components, the output signal can be provided via dedicated output connections, including, for example, HDMI ports, USB ports, or COMP outputs.

FIG. 1C illustrates a block diagram of an example of the server 1 in which various aspects and embodiments are implemented. Server 1 is very similar to the user game system 2. The server 1 can be embodied as a device including the various components described below and is configured to perform one or more of the aspects and embodiments described in this document. Examples of such devices include, but are not limited to, various electronic devices such as personal computers, laptop computers and a server. Elements of the server 1, singly or in combination, can be embodied in a single integrated circuit (IC), multiple ICs, and/or discrete components. For example, in at least one embodiment, the server 1 comprises one processing module 100 that implements the steps of a gaming application concerning the server 1 as represented below by the left side of FIG. 5. In various embodiments, the server 1 is communicatively coupled to one or more other systems, or other electronic devices, via, for example, a communications bus or through dedicated input and/or output ports. In various embodiments, the server 1 is configured to implement one or more of the aspects described in this document.

The input to the processing module 100 can be provided through various input modules as indicated in block 101 already described in relation to FIG. 1D.

Various elements of the server 1 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the server 1, the processing module 100 is interconnected to other elements of said server 1 by the bus 1005.

The communication interface 1004 of the processing module 100 allows the server 1 to communicate on the communication channel 3.

Data (for example data representative of the user actions) is provided to the server 1 or (for example the video stream) transmitted (streamed) by the server 1, in various embodiments, using a wireless network such as a Wi-Fi network, for example IEEE 802.11 (IEEE refers to the Institute of Electrical and Electronics Engineers). The Wi-Fi signal of these embodiments is received over the communications channel 3 and the communications interface 1004 which are adapted for Wi-Fi communications. The communications channel 3 of these embodiments is typically connected to an access point or router that provides access to external networks including the Internet for allowing streaming applications and other over-the-top communications. Other embodiments provide data to the server 1 or allow the server to transmit data using the RF connection of the input block 101.

Additionally, various embodiments use wireless networks other than Wi-Fi, for example a cellular network or a Bluetooth network.

The data provided to or transmitted by the server 1 can be provided or transmitted in different format. In various embodiments, in case of transmission, these data are encoded and compliant with a known video compression format such as MPEG-4/AVC (ISO/CEI 14496-10), HEVC (ISO/IEC 23008-2—MPEG-H Part 2, High Efficiency Video Coding/ITU-T H.265)), EVC (Essential Video Coding/MPEG-AV1, VP9 or the international standard entitled Versatile Video Coding (VVC) under development by a joint collaborative team of ITU-T and ISO/IEC experts known as the Joint Video Experts Team (JVET).

The server 1 can provide an output signal to various output devices capable of storing, decoding and/or displaying the output signal such as the user game system.

Various implementations involve decoding. "Decoding", as used in this application, encompasses all of the processes performed, for example, on a received encoded video stream in order to produce a final output suitable for display. In various embodiments, such processes include the processes typically performed by a decoder, for example, entropy decoding, inverse quantization, inverse transformation, and prediction.

Various implementations involve encoding. In an analogous way to the above discussion about "decoding", "encoding" as used in this application encompasses all of the processes performed, for example, on the frames generated by the rendering step 203 in order to produce an encoded video stream. In various embodiments, such processes include the processes typically performed by an encoder, for example, partitioning, prediction, transformation, quantization, and entropy encoding.

Note that the syntax elements names as used in the following, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the video encoder signals a use of some coding tools. In this way, in an embodiment the same parameters can be used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream and SEI messages of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

FIG. 5 illustrates schematically an example of a method for reducing latency in a cloud gaming application.

In the method for reducing latency of FIG. 5, the user game system 2 is capable of registering an action of a user, called current action, and to transmit to the server 1 an information representative of said current action. The server, on its side, is capable of predicting at least one future game state from the current action and from a current state of the game, to generate at least one frame, called predicted frame. Each predicted frame corresponds to one future state. At least one predicted frame is transmitted to the user game system 2. For each transmitted predicted frame, information allowing making a link between the predicted frame and the current action is obtained by the user game system 2 to determine when displaying the predicted frame.

The method of FIG. 5 is derived from the method of FIG. 3. Comparing to FIG. 3, steps were split in steps executed by the server 1 on the left side and steps executed by the user game system 2 on the right side.

In step 200, the processing module 100 of the user game system 2 registers a user action (i.e. a current action).

Step 301 of FIG. 3 is split in steps 301A and 301B. In step 301A, the processing module 100 of the user game system 2 transmits information representative of the current action.

In step 301B, the processing module 100 of the server 1 receives the information representative of the current action.

This information is used by the processing module 100 of the server 1 to predict at least one future state of the game applying steps 201, 202 and 203.

In step 201, the processing module 100 of the server 1 predicts at least one game sate corresponding to a time t using, for example, a method based on states prediction. Predicting a game state consists for example in predicting a future action of the user, called predicted action, from the current action.

In step 202, the processing module 100 of the server 1 uses the game engine to determine, for at least one of the predicted action, a state of the game corresponding to said predicted action, called predicted state.

In step 203, for at least one of the predicted state determined in step 202, the processing module 100 of the server 1 applies a rendering step from said predicted state to generate a predicted frame, called frame t. Since a plurality of predicted states of the game could be predicted in step 202, the processing module 100 of the server 1 can predict a frame t for each predicted state of the plurality. In an embodiment, each predicted frame is a portion of a larger frame. The larger frame is for example a background of a scene representing the game, while each predicted frame represents a character or an avatar evolving in the scene. The larger frame is for example generated by the processing module 100 of the user game system 2 since it (i.e. the background it represents) doesn't depend on the user actions.

In a step 304*bis*, the processing module 100 of the server 1 encodes at least one of the frame t in a video stream. The processing module 100 of the server 1 implements therefore a video encoding module. Any known encoding method could be used in step 304*bis* such as AVC, HEVC, VVC, EVC, AV1 or VP9.

Steps 201, 202, 203 and 304*bis* allows therefore obtaining at least one encoded frame t.

Step 305 of FIG. 3 is split in steps 305A and steps 305B in FIG. 5.

In step 305A, the processing module 100 of the server 1 transmits a portion of the video stream corresponding to at least one of the frame t to the user game system 2.

In step 305B, the processing module 100 of the user game system 2 receives the portion of the video stream corresponding to the at least one frame t.

In a step 306*bis*, the processing module 100 of the user game system 2 decodes said portion of the bitstream to reconstruct the at least one frame t. The processing module 100 of the user game system 2 implements therefore a video decoding module. A decoding method corresponding to the encoding method used in step 304*bis* is used in step 306*bis*.

In a step 500, the processing module 100 of the user game system 2 determines at which time displaying one of the decoded frame t.

In a step 207*bis*, said frame t is displayed under the control of the processing module 100 of the user game system 2 at the time determined in step 500.

In a first embodiment of the method of FIG. 5, one action is predicted in step 201. Hence, one frame t is generated and the processing module 100 of the user game system 2 receives and decodes said frame t.

In a first variant of the first embodiment, the processing module 100 of the user game system 2 registers a time $t_a$ at which the current action occurred in step 200. In addition an information representative of a delay between the time $t_a$ and a time $t_d$ at which a frame corresponding to said current action, called round-trip latency (RTL) in the following, is displayed on the user game system side is obtained by the processing module 100 of the server 1 and by the processing module 100 of the user game system 2. Using the information representative of the round-trip latency RTL, the processing module 100 of the server 1 adjusts a lookahead delay Δt fixing a time t at which a future state corresponding to the current action needs to be predicted to at least compensate the round-trip latency RTL in step 201. In other words, the lookahead delay Δt should be at least equal to the round-trip latency RTL (i.e. Δt≥RTL). Reducing Δt (i.e. having Δt as close as possible to RTL) allows a more accurate game state prediction. Increasing Δt allows being more resilient to the network latency variations. Assuming that the frames are encoded at a constant frame rate and in display order, the knowledge of said round-trip latency RTL allows the processing module 100 of the user game system 2, when receiving a frame, to deduce in step 500, from the time of reception of said frame, to which user action corresponds said frame. Consequently, when the received frame corresponds to the action of the user performed at time $t_a$, the round-trip latency RTL is an information allowing the processing module 100 of the user game system 2 determining if said frame corresponds to said action. The processing module 100 of the user game system 2 can then make a link between a timestamp of the frame t and the time $t_a$ at which the current action corresponding to said frame t occurred.

Each time the processing module 100 of the user game system 2 makes a link between a timestamp of a frame t and the time $t_a$ at which a user action occurred, the processing module 100 of the user game system 2 can resynchronize the clock of the processing module 100 of the user game system 2 on the clock of the processing module 100 of the server 1. Having synchronized clocks and knowing the frame rate allows the processing module 100 of the user game system 2 determining when displaying a frame using the timestamp in step 500.

The round-trip latency RTL could be approximated by measuring round-trip times (RTTs) between a transmission of a packet and the reception of an acknowledgment for this packet. RTTs can be estimated by the processing module 100 of the server 1 (respectively by the processing module 100 of the user game system 2) and an information representative of the round-trip latency RTL based on the estimation of the RTT can be transmitted to the processing module 100 of the user game system 2 (respectively to the processing module 100 of the server 1). RTT can also be estimated by both the processing module 100 of the server 1 and the processing module 100 of the user game system 2.

In a second variant of the first embodiment, no information representative of the round-trip latency RTL is obtained by the server 1. Consequently, without the information representative of the round-trip latency RTL, the processing module 100 of the server 1 cannot adjust the lookahead delay Δt to said round-trip latency RTL. In that case, the lookahead delay Δt is predefined on the server 1 side. Then the processing module 100 of the user game system 2 uses the same process as in the first variant to synchronize its clock on the clock of the processing module 100 of the server 1 and then to determine when displaying a frame.

In a third variant of the first embodiment, in order for the processing module 100 of the user game system 2 to estimate more accurately the round-trip latency RTL, a new SEI message is exchanged between the user game system 2 and the server 1. In step 301A, the information representative of the user action comprises an identifier input_timing of said user action.

In a step 304*bis*, the processing module 100 of the server 1 associates with the portion of video stream corresponding to frame t, a SEI message frame_timing_sei( ) comprising the user action identifier input_timing.

TABLE TAB1 frame_timing_sei( ) {
   input_timing
}

An example of syntax of a SEI message frame_timing_sei( ) intended to convey the identifier input_timing is described in table TAB1. Using the identifier input_timing, the processing module 100 of the user game system 2 can easily retrieve the corresponding registered time $t_a$. The round-trip delay RTL can then be computed as the difference between the time $t_a$ and the reception time of the SEI message frame_timing_sei( ). In an embodiment, the identifier input_timing is representative of the time $t_a$ at which the user action has been registered.

In a fourth variant of the first embodiment, the SEI message frame_timing_sei( ) is complemented with an additional information lookahead_timing representative of the lookahead delay Δt fixing the time t at which a predicted state corresponding to the user action is predicted.

TABLE TAB2

```
frame_timing_sei( ) {
    input_timing
    Lookahead_timing
}
```

An example of syntax of the SEI message frame_timing_sei( ) comprising the information lookahead_timing is described in table TAB2. Knowing the registered time $t_a$ corresponding to the identifier input_timing and the information lookahead_timing, the processing module 100 of the user game system 2 can determine directly the display time T of the frame t:

$$T = t_a + \Delta t$$

Having an information lookahead_timing representative of a $\Delta t = 0$ indicates that there is no state prediction of the server 1 side.

When the lookahead delay $\Delta t$ is high ($\Delta t > 100$ ms), which is generally the case when the round-trip latency RTL is high, the risk of bad prediction during step 201 is high.

FIG. 6 illustrates schematically a state prediction process wherein prediction errors occur.

From a starting real state x=0, a user executes an action represented by a velocity v=1. Assuming a constant velocity and with a lookahead delay $\Delta t = 2$, a state predictor predicts at time t=1, a state of x=3 for time t=3. As the user stops its action immediately (velocity v=0), the real state remains at x=1 for times t=2, 3 and 4. When t=3, the state error is therefore e=predicted state−real state=3−1=2.

One possible solution to deal with bad prediction is to allow prediction of a plurality of possible future states.

A predictor can use for example a Bayesian model for modeling the predictions.

In the example of FIG. 6, assuming only two possible velocity values v={0,1} (only two actions are possible), the state prediction process can for example use a 2-states Markov model as represented in FIG. 7.

FIG. 7 represents a two states Markov model modeling states of a game.

According to the model of FIG. 7, when the user executes an action corresponding to a velocity v=0 at time t, then the probability of having a velocity v=0 at time t+1 is p=0.7 and the probability of having a velocity v=1 at time t+1 is 1−p=0.3

When the user executes an action corresponding to a velocity v=1 at time t, then the probability of keeping the velocity v=1 at time t+1 is q=0.8 and the probability of having a velocity v=0 at time t+1 is 1−q=0.2.

Assuming a current state x=0 and current velocity v=0, and the model above, probabilities of states represented in table TAB3 are obtained:

TABLE TAB3

| time | Proba. x = 0 | Proba. x = 1 | Proba. x = 2 | Proba. x = 3 |
|---|---|---|---|---|
| t = 0 | 1 | 0 | 0 | 0 |
| t = 1 | 0.7 | 0.3 | 0 | 0 |
| t = 2 | 0.49 | 0.21 + 0.06 = 0.27 | 0.24 | 0 |
| t = 3 | 0.343 | 0.147 + 0.042 + 0.042 = 0.231 | 0.168 + 0.018 + 0.048 = 0.234 | 0.192 |

For a lookahead delay of $\Delta t = 3$, then the future states at time t=3 in order of the most probable to the less probable are states x=0, x=1 and x=2 and x=3.

The above example is a very simple Markov modeling of the user actions, but in practice more sophisticated models can be used, especially learnt models, etc.

In a second embodiment of the method of FIG. 5, a plurality of states are predicted in step 201. Hence, a plurality of frames t are generated by the processing module 100 of the server 1.

In that case, a multi-layers video encoder is used to generate a multi-layer video stream in step 304*bis* and a corresponding multi-layers video decoder is used to decode said multi-layer video stream in step 306*bis*. These multi-layers video encoder and decoder could be based for example on the scalable extension of AVC (i.e. SVC (Scalable Video Coding)), HEVC (i.e. SHVC (Scalable High efficiency Video Coding) or VVC, or on the multi-view extension of AVC (i.e. MVC (Multi-view Video Coding)), HEVC or VVC.

Each frame t of the plurality of frames t is encoded in one layer of the multi-layer video stream.

In a first variant of the second embodiment, the frame t corresponding to the most probable state of the game, i.e. the most probable frame t, is encoded in a base layer of the multi-layer video stream. An information representative of at least one state of the game, here a predicted state of the game represented by a probability of a frame t, is used to control the multi-layer encoding of the multi-layer video stream. By base layer, here one means a coded video layer that is not predictively coded from any other video layer, and which may serve as a reference for the prediction of some other layer. Each other frame t of the plurality is encoded in another layer, called enhancement layer. The encoding of an enhancement layer uses the base layer as a reference layer for inter-layer prediction and/or any other layer encoded before said enhancement layer. In this first variant of the second embodiment, the frames t of the plurality are encoded in order of decreasing probability. The most probable frames t are therefore encoded before the less probable frames t. Note that, because each state is only slightly different from the most probable state, frames t of the plurality would be similar and each enhancement layer can be efficiently encoded using inter-layer prediction.

In a second variant of the second embodiment, the order of encoding of less probable frames t in the enhancement layers depends on the difference between the state represented by each frame t and the states represented in frame(s) t already encoded in another layer. An information representative of at least one state of the game, here differences between the predicted states of the game, is used to control the multi-layer encoding of the multi-layer video stream. For example, the frame t that is encoded in a first enhancement layer is the frame t of the plurality corresponding to the state the closest to the state represented by the frame t encoded in the base layer. The frame t that is encoded in a second enhancement layer is the frame t of the plurality corresponding to the state the closest to the state represented by the frame t encoded in the base layer and/or by the frame t encoded in the first enhancement layer. In the example of table TAB3, the most probable frame t corresponding to the state x=0 is encoded in the base layer. The state x=1 is the closest to the state x=0. The frame t corresponding to the state x=1 is therefore encoded in the first enhancement layer. The state x=2 is the closest to the states x=0 and x=1. The frame t corresponding to the state x=2 is therefore encoded in the second enhancement layer.

FIG. 8 illustrates schematically an example of multi-layer video encoding.

In FIG. 8, the arrows show the inter frames dependencies for inter-layer or temporal prediction. For example, at time t=0, the frame t of layer 2 uses the frame t of the base layer as a reference frame for inter-layer prediction. For each frame t, the game state (x value) used to render the frame t is shown. On a vertical axis, the multi-layer video encoder uses the base layer for inter-layer prediction since frames t corresponding to a same time are pretty similar. On an horizontal axis, the multi-layer video encoder can advantageously uses past frames from different layers as reference frames, depending on the game state difference (for example at time t=2, the frame t=2 of the base layer might use the frame t=1 of layer 1 since the game state was the same).

The frame displayed at time t=3 on user game system 2 side is represented with a textured background. This displayed frame corresponds to the frame t=0 of layer 2 since said frame corresponds to the predicted state the closest to the real state (x=2).

In the second embodiment of the method of FIG. 5, said method comprises a step 501 during which the processing module 100 of the user game system 2 determines which frame t (i.e. which layer) of the plurality of frames t (i.e. of the multiple layers) it has received displaying in function of a comparison between an information representative of an actual state of the game and an information representative of a predicted state represented by frames of the plurality.

In the first or second variants of the second embodiment, in order to allow the processing module 100 of the user game system 2 to select the frame t to decode corresponding to the game state the closest to the real state, a SEI message layer_state_sei( ) is associated to the portion of video stream representing the plurality of frames t.

TABLE TAB4

```
layer_state_sei( ) {
  number_of_state
  for( i = 0; i < number_of_state ; i++ )
    state_id[i]
    state[i]
}
```

A first example of syntax of the SEI message layer_state_sei( ) is described in table TAB4. The SEI message layer_state_sei( ) comprises:
- a syntax element number_of_state representative of the number of different game states (i.e. the number of future game states) considered by the processing module 100 of the server 1 in step 201. The number of states number_of_state is equal to the number of layers. In the example of FIG. 8, number_of_state=3. In an embodiment, each game state is associated to a layer. In other words, each state number is associated to a layer number. For example, in FIG. 8, the state "0" is associated to the base layer, the state "1" is associated with layer "1" and the state "2" is associated with layer "2".
- for each game state, a syntax element state id representing a unique identifier on which the processing module 100 of the server 1 and the processing module 100 of the user game system 2 agreed on to identify a particular type of information representing a state. For example, in the above examples, one can set the state id "0" to the user position x.
- for each game state, a syntax element state representing a value of an information representing a state of type state id.

In the example of FIG. 8, at t=1, the following SEI messages are associated to the frames t=1:

|  | Value |
| --- | --- |
| frame_timing_sei( ) { | |
|   input_timing | 1 |
|   lookahead_timing | 3 |
| } | |

|  | Value |
| --- | --- |
| layer_state_sei( ) { | |
|   number_of_state | 3 |
|   state_id[0] | 0 |
|   state[0] | 0 |
|   state_id[1] | 0 |
|   state[1] | 1 |
|   state_id[2] | 0 |
|   state[0] | 2 |
| } | |

At t=3, in step 500, the processing module 100 of the user game system 2 knows the real game state (x=2) and reads the SEI messages. From the SEI message frame_timing_sei( ), the processing module 100 of the user game system 2 knows that the portion of video stream comprising a plurality of frames t corresponds to an action identified by the value of the syntax element input_timing (here "1") and that the processing module 100 of the server 1 predicted future actions from said action with a lookahead delay of value represented by lookahead_timing (here "3"). From these information the processing module 100 of the user game system 2 knows when displaying one of the frame t of the plurality.

From the SEI message layer_state_sei( ), in step 501, the processing module 100 of the user game system 2 knows that a number number_of_state (here "3") of future states were considered in step 201 by the processing module 100 of the server 1. Moreover, the processing module 100 of the user game system 2 knows that the frame t representing the predicted state the closest to the real state is in layer 2. Said frame t is then selected for display in step 501.

Until now, it is considered that the processing module 100 of the user game system can derive a current state of the game for example from the user action. For example, in simple games, a position of a user in the game x can be derived from a user action represented by a velocity v.

However, deriving a game state from user actions is difficult in complex games, for example due to interactions of the user with objects in the game or with other users. Indeed, simulating complex games states is difficult to perform on the user game system 2 side, in particular since it doesn't have a game engine nor a rendering engine. Consequently, in these cases, it is difficult for the processing module 100 of the user game system 2 to determine if a game state identified by the syntax element state[ ] corresponds to its last action.

A second example of syntax of the SEI message layer_state_sei( ) agnostic to the current state computation is described in table TAB5.

TABLE TAB5

```
layer_state_sei( ) {
  num_sequence
  inputs_sequence_count
  for( j = 0; j <  num_sequence; i++ ) {
    for( i = 0; i <  Inputs_sequence_count; i++ ) {
      input_id[j][i]
      input_value[j][i]
    }
  }
}
```

Instead of representing game states, the SEI message layer_state_SEI( ) represents sequences of predicted user actions. the SEI message layer_state_SEI( ) comprises:

a syntax element num_sequence representing a number of sequences of predicted user actions considered by the processing module 100 of the server 1 to generates a plurality of frames t. In the example of FIG. 8, the number of sequences num_sequence is equal to "3". Each sequence number is associated to a layer. For example, in FIG. 8, the sequence number "0" is associated with the base layer, the sequence number "1" is associated with the layer "1" and the sequence number "2" is associated to the layer "2".

a syntax element input sequence count representing a number of predicted user actions in a sequence of predicted user actions considered by the processing module 100 of the server 1 to generates a plurality of frames t;

for each user action of a sequence, a syntax element input_id[ ][ ]. The syntax element input_id is a unique identifier on which the processing module 100 of the server 1 and the processing module 100 of the user game system 2 agreed on to identify a particular type of information representing a user action (or representing a combination of information representing a user action). For example, in the above example of FIG. 8, one can set the syntax element input_id[ ] to "0" to the velocity v.

for each user action of a sequence, a syntax element input_value[ ][ ] providing a value of the information representing a user action (or of the combination of information) of type input_id1[ ][ ].

In the example of FIG. 8, the following SEI message layer_state_sei( ) is obtained:

| | Value |
|---|---|
| layer_state_sei( ) { | |
| num_sequence | 3 |
| inputs_sequence_count | 3 |
| input_id[0][0] | 0 |
| input_value[0][0] | 0 |
| input_id[0][1] | 0 |
| input_value[0][1] | 0 |
| input_id[0][2] | 0 |
| input_value[0][2] | 1 |
| input_id[1][0] | 0 |
| input_value[1][0] | 1 |
| input_id[1][1] | 0 |
| input_value[1][1] | 1 |
| input_id[1][2] | 0 |
| input_value[1][2] | 1 |
| input_id[2][0] | 0 |
| input_value[2][0] | 0 |
| input_id[2][1] | 0 |
| input_value[2][1] | 1 |

-continued

| | Value |
|---|---|
| input_id[2][2] | 0 |
| input_value[2][2] | 1 |
| } | |

Which means that a first sequence of user actions (represented in FIG. 8) is represented by the following sequence of velocity values v=[0, 0, 1], a second sequence of user actions (not represented in FIG. 8) is represented by the following sequence of velocity values v=[1, 1, 1] and a third sequence of user actions (not represented in FIG. 8) is represented by the following sequence of velocity values v=[0, 1, 1].

One advantage of the second example of SEI message layer_state_sei( ) is that on the user game system 2 side, no sophisticated state computation is needed. Only the sequence of user actions is needed. In step 501, the processing module 100 of the user game system 2 compares a sequence of real user actions and the sequences of user actions represented in the SEI message layer_state_sei( ) to determine the closest sequence. Then the processing module 100 of the user game system 2 deduces which frame t (which layer) to display from the sequence of user actions represented in the SEI message layer_state_sei( ) the closest to the real sequence of user actions.

Until now, the multi-layer encoding was performed without taking into account the frame t actually displayed on the user game system 2 side nor taking into account the real actions performed by the user in the encoding process except for predicting future states (i.e. future actions). One can note that the information representative of a user action received in step 301B is representative of a frame t displayed on the user game system 2 side. Indeed, the processing module 100 of the server 1 knows which frame t was generated from the predicted action (or the sequence of predicted actions) the closest to the real user action (or real sequence of user actions).

In a second embodiment of step 304*bis*, the processing module 100 of the server 1 use the information representative of the frame t actually displayed on the user game system 2 side to control which frame(s) or which layer is to be used for temporal prediction of next frames. In this second embodiment, an information representative of at least one state of the game, here a real state represented by a displayed frame, is taken into account for the encoding of the multi-layer video stream. For example, assuming the temporal prediction uses one frame as a reference frame, when encoding current frames t=T, the processing module 100 of the server 1 use the frame t=T−1 corresponding to last displayed layer known by the processing module 100 of the server 1 for temporal prediction of frame t=T.

FIG. 9 illustrates an example of application of the second embodiment of step 304*bis*.

In FIG. 9 the lookahead delay is assumed to be Δt=2.

Frames actually displayed on the user game system 2 side are represented with a textured background.

In each frame, we show the time for which the frame was rendered, for example at time t=0, frames t=2 are rendered.

At time t=2, in step 301B, the processing module 100 of the server 1 receives an information representative of a user action (which is also representative of the frame actually displayed by the user game system 2 at time t=0). As the displayed frame at time t=0 is in the base layer, the processing module 100 of the server 1 continues the encoding using the frames of the base layer as reference frames for temporal prediction of future frames of the base layer.

At time t=3, in step 301B, the processing module 100 of the server 1 receives an information representative of the frame actually displayed by the user game system 2 at time t=1. As the displayed frame at time t=1 is in the layer 1, the processing module 100 of the server 1 use a frame in layer 1 as reference frames for temporal prediction of future frames of the base layer. By doing this, the new reference frame is likely to be closer to the future frames to be encoded.

Until now, the bandwidth available on the network 3 was not taken into account during for the encoding of the multi-layer video stream. However, it is known that the network bandwidth is generally limited and that it is preferable to apply a rate control when encoding a video stream to ensure that said video stream is compliant with the available bandwidth.

In a third embodiment of step 304bis a rate control is applied during the encoding of the multi-layer video stream. This rate control could be based for example on a rate distortion optimization of the encoding under a bandwidth constraint.

As described earlier, some layers are less probable than other since they were encoded based on future games states that are less probable than others. In the third embodiment of step 304bis the available bandwidth is divided between layers in function of the probability of each layer. In this third embodiment, an information representative of at least one state of the game, here predicted states of the game represented by their probabilities, is taken into account for the encoding of the multi-layer video stream. For example, in the example of FIG. 8, 70% is allocated to the encoding of the base layer which corresponds to the most probable layer, 10% is allocated to the layer 2 which corresponds to the less probable layer and 20% is allocated to the layer 1 which has an intermediate probability between the base layer and layer 2.

We described above a number of embodiments. Features of these embodiments can be provided alone or in any combination. Further, embodiments can include one or more of the following features, devices, or aspects, alone or in any combination, across various claim categories and types:

A bitstream or signal that includes one or more of the described syntax elements, or variations thereof Creating and/or transmitting and/or receiving and/or decoding a bitstream or signal that includes one or more of the described syntax elements, or variations thereof A cell phone, tablet, game console, server, personal computer, or other electronic device that performs at least one of the embodiments described.

A cell phone, tablet, game console, server, personal computer or other electronic device that performs at least one of the embodiments described, and that displays (e.g. using a monitor, screen, or other type of display) a resulting image.

A cell phone, tablet, game console, personal computer or other electronic device that tunes (e.g. using a tuner) a channel to receive a signal including an encoded video stream, and performs at least one of the embodiments described.

A cell phone, tablet, game console, personal computer or other electronic device that receives (e.g. using an antenna) a signal over the air that includes an encoded video stream, and performs at least one of the embodiments described.

A server, personal computer or other electronic device that tunes (e.g. using a tuner) a channel to transmit a signal including an encoded video stream, and performs at least one of the embodiments described.

A server, personal computer or other electronic device that transmits (e.g. using an antenna) a signal over the air that includes an encoded video stream, and performs at least one of the embodiments described.

The invention claimed is:

1. A method for controlling a display of a frame representing a state of a frame- based interactive application comprising:
    sending via a network an identifier of a user action to a server;
    receiving from the server via the network at least one frame representing a predicted state of the frame-based interactive application predicted from the user action, each predicted state being a state of the frame-based interactive application at a future time different from an actual state of the frame-based interactive application at a time of the user action;
    obtaining information in the form of metadata along with the at least one frame, the information comprising the identifier of the user action, the information allowing determining that a received frame of the at least one frame corresponds to the user action; and
    responsive to a frame of the at least one frame corresponds to the user action, determining when displaying the frame in function of a time at which the user action was performed and of the information.

2. The method of claim 1, wherein the information is further representative of a delay between the time at which the action was performed and a time at which a frame corresponding to the user action is displayed.

3. The method of claim 1, wherein the method is executed by a user system and wherein, the information allows synchronizing a clock of the user system on a clock of the server which allows determining when displaying the frame based on a timestamp of the frame and on a frame rate of the frame-based interactive application.

4. The method of claim 1, wherein the metadata comprise an information representative of a delay fixing a time at which a predicted state is predicted.

5. The method of claim 1, wherein a plurality of frames, each representing a predicted state of the frame-based interactive application predicted from the user action, are received and wherein the method further comprises determining which frame of the plurality when displaying based on comparisons between an information representative of an actual state of the frame-based interactive application and information representative of predicted states of the frame-based interactive application.

6. The method of claim 5, wherein the metadata comprises, for each frame of the plurality, an information representing a state of the frame-based interactive application represented by the frame.

7. A method comprising:
    receiving via a network from a user system an information representative of a user action in a frame-based interactive application comprising an identifier of the user action;
    predicting at least one predicted state of the frame-based interactive application from the user action, each predicted state being a state of the frame-based interactive application at a future time different from an actual state of the frame-based interactive application at a time of the user action;
    for at least one predicted state, rendering a frame representing the predicted state;

encoding in a portion of video data at least one rendered frame along with information in the form of metadata comprising the identifier of the user action; and transmitting the portion of video data to the user system via the network.

8. The method of claim 7, wherein the metadata comprise an information representative of a delay fixing a time at which a predicted action corresponding to the user action is predicted.

9. The method of claim 7, wherein a plurality of frames, each representing a predicted state of the frame-based interactive application, are rendered and encoded along with metadata comprising information representative of each predicted state.

10. The method of claim 9, wherein the encoding of the plurality of frames uses a multi-layer encoding wherein each frame of the plurality of frames is encoded in a different layer, the multi-layer encoding taking into account information representative of an actual state of the frame-based interactive application or information representative of the predicted states of the frame-based interactive application or a combination thereof.

11. The method of claim 7, wherein the at least one predicted state of the frame-based interactive application comprises a plurality of predicted states and each rendered frames is encoded in one layer of a plurality of layers of the video data using a multi-layer encoding taking into account an information representative of at least one actual state or predicted state of the frame-based interactive application.

12. The method of claim 11, wherein an information representative of a predicted state is a probability that the predicted state is the closest to an actual state corresponding temporally to the predicted state.

13. The method of claim 12, wherein the frame corresponding to the highest probability is encoded in a base layer encoded without any prediction from any other layer and which serves as a reference for prediction of other layers.

14. The method of claim 12, wherein a bitrate is allocated to each layer for encoding the layer in function of the probability of the layer.

15. The method of claim 11, wherein an information representative of an actual state is an information representative of a frame of a plurality of frames displayed by a user system to which the plurality of frames was transmitted.

16. The method of claim 15, wherein, a first layer providing a frame for temporal prediction of a current frame of a second layer is determined in function of the frame of the plurality of frames displayed by a user system.

17. The method of claim 15, wherein the information representative of the frame of the plurality of frames displayed by the user system is an information representative of a user action received from the user system.

18. The method of claim 11, wherein an information representative of a predicted state comprises differences between the predicted states.

19. A device for controlling a display of a frame representing a state of the frame-based interactive application comprising electronic circuitry configured for:

sending via a network an identifier of a user action to a server;

receiving from the server via the network at least one frame representing a predicted state of the frame-based interactive application predicted from the user action, each predicted state being a state of the frame-based interactive application at a future time different from a state of the frame-based interactive application at a time of the user action;

obtaining information in the form of metadata comprising the identifier of the user action, the information allowing determining that a frame of the at least one frame corresponds to the user action; and determining when displaying a frame of the at least one frame based on a time at which the user action was performed and based on the metadata responsive to the frame corresponds to the user action.

20. A device comprising electronic circuitry configured for:

receiving from a user system via a network an information representative of a user action in a frame-based interactive application comprising an identifier of the user action;

predicting at least one predicted state of the frame-based interactive application from the user action, each predicted state being a state of the frame-based interactive application at a future time different from an actual state of the frame-based interactive application at a time of the user action;

rendering, for at least one predicted state, a frame representing the predicted state;

encoding in a portion of video data at least one rendered frame along with metadata comprising the identifier of the user action; and transmitting the portion of video data to the user system.

* * * * *